United States Patent
Johnson et al.

(10) Patent No.: US 8,428,075 B1
(45) Date of Patent: Apr. 23, 2013

(54) SYSTEM AND METHOD FOR EFFICIENT SHARED BUFFER MANAGEMENT

(75) Inventors: John Delmar Johnson, Los Altos, CA (US); Abhijit Ghosh, Sunnyvale, CA (US); Manju Agrawal, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 392 days.

(21) Appl. No.: 12/473,408

(22) Filed: May 28, 2009

(51) Int. Cl.
*H04L 12/56* (2006.01)

(52) U.S. Cl.
USPC .......................................................... 370/412

(58) Field of Classification Search .................. 370/412, 370/229, 230, 235, 389, 392; 709/226, 234
See application file for complete search history.

(56) References Cited

U.S. PATENT DOCUMENTS 7,404,058 B2 * 7/2008 Lo et al. ......................... 711/168
2007/0104211 A1 * 5/2007 Opsasnick .................... 370/412
2009/0006808 A1 * 1/2009 Blumrich et al. ............... 712/12
2009/0245104 A1 * 10/2009 Nishimura et al. ........... 370/230

OTHER PUBLICATIONS

Cidon, Israel; Georgiadis, Leonidas; Guerin, Roch and Khamisy, Asad, "Optimal Buffer Sharing".
Choudhery, Abhijit K. and Hahne, Ellen L., "Dynamic Queue Length Thresholds for Shared-Memory Packet Switches".

* cited by examiner

*Primary Examiner* — Man Phan
*Assistant Examiner* — Nourali Mansoury
(74) *Attorney, Agent, or Firm* — Harrity & Harrity, LLP

(57) ABSTRACT

A method for managing a shared buffer between a data processing system and a network. The method provides a communication interface unit for managing bandwidth of data between the data processing system and an external communicating interface connecting to the network. The method performs, by the communication interface unit, a combined de-queue and head drop operation on at least one data packet queue within a predefined number of clock cycles. The method also performs, by the communication interface unit, an en-queue operation on the at least one data packet queue in parallel with the combined de-queue operation and head drop operation within the predefined number of clock cycles.

20 Claims, 5 Drawing Sheets

SYSTEM AND METHOD FOR EFFICIENT SHARED BUFFER MANAGEMENT

FIELD OF THE INVENTION

The present invention generally relates to buffer management, and relates more particularly to shared buffer management in a network router.

BACKGROUND

Network packet routers use buffer management techniques to share limited buffer space between various incoming data ports and classes of data packets. Typically, the packets are divided into cells that are managed by a set of queues. Packets from multiple ports are en-queued to multiple queues based on their classified priority and de-queued based on available bandwidth of the shared output port(s). Often the available output bandwidth is less than in aggregate input bandwidth and packets must be dropped because there is limited shared buffer memory. If there is efficient buffer management of the shared buffer memory, overall loss performance, as well as fairness between ports, can be improved. However, there are many restrictions on implementing the buffer management scheme. The hardware implementing the management must operate at the rate of the incoming packets, and this rate approaches the maximum rate that can be realized using current memory technology.

Prior work has shown that overall fairness of queue management is maximized by dropping packets from the head of the queues. This process, called a "head-drop" process, drops packets from the head of the queue when buffer space is low, so that new packets may be inserted at the tail of the queue. The use of a head-drop process in parallel with a de-queue process achieves superior fairness among the queues. However, the parallel operation of the head-drop and de-queue operations requires that the data structure implementing the queues be able to support parallel access from the two processes. Thus, the memory implementing the queue structure needs a higher bandwidth than is required by the de-queue process alone to support parallel operation. The use of this higher bandwidth to support the parallel head-drop and de-queue operations is inefficient. Furthermore, head-drop mechanisms are often unable to limit queue length under worst case traffic patterns, and require an additional process in order to ensure correct functionality. This additional process is typical a "tail drop" process, where packets are dropped from the tail of the queue. Alternately, instead of head-drop, a tail-drop operation based on thresholds may be implemented during the en-queue process. In these cases, the increased bandwidth requirements do not occur. However, tail-drop operations are not as efficient as head-drop operations.

SUMMARY

A method for managing a shared buffer between a data processing system and a network is disclosed in accordance with one embodiment of the present disclosure. The method of the present disclosure comprises providing a communication interface unit for managing bandwidth of data between the data processing system and an external communicating interface connecting to the network; performing, by the communication interface unit, a combined de-queue and head drop operation on at least one data packet queue within a predefined number of clock cycles, and performing, by the communication interface unit, an en-queue operation on the at least one data packet queue in parallel with the combined de-queue operation and head drop operation within the predefined number of clock cycles.

A data processing system is also disclosed in accordance with another embodiment of the present disclosure. The data processing system comprises a communication interface unit for managing bandwidth of data packets received from a network, the communication interface unit comprising a clock for generating a predefined number of clock cycles, a memory comprising at least one data packet queue of at least one packet, and a buffer manager for performing an en-queue operation and a combined de-queue head drop operation in parallel within the predefined number of clock cycles.

A computer program product comprising computer-implemented instructions is also disclosed for performing a combined de-queue and head drop operation on at least one data packet queue within a predefined number of clock cycles; and performing an en-queue operation on the at least one data packet queue in parallel with the combined de-queue operation and head drop operation within the predefined number of clock cycles.

Other systems, methods, features, and advantages consistent with the present disclosure will become apparent to one with skill in the art upon examination of the following figures and detailed description. It is intended that such additional systems, methods, features, and advantages be included within this description and be within the scope of the disclosure.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION

Methods and systems consistent with the present invention provide both an en-queue operation and the combined de-queue head-drop operation running in the same clock domain and both requiring a predefined number of clock cycles (n cycles). The predefined number of clock cycles may be referred to as a cell start period. The en-queue operation divides the input packets into fixed size cells, and requires that a cell be available from the shared buffer whenever one is needed. The combined de-queue head-drop operation will remove one cell every n cycles or cell start period. The head drop process will not run until the shared buffer is full (or almost full). Once the shared buffer becomes full, the combined de-queue head-drop operation will delete cells from the queue at the same rate that the en-queue process en-queues cells. Thus, there will be at least one cell available for the en-queue process to use because the combined de-queue head-drop operation freed a cell during the same cell start period.

Reference will now be made in detail to an implementation consistent with the present invention as illustrated in the accompanying drawings.

Figure 1:
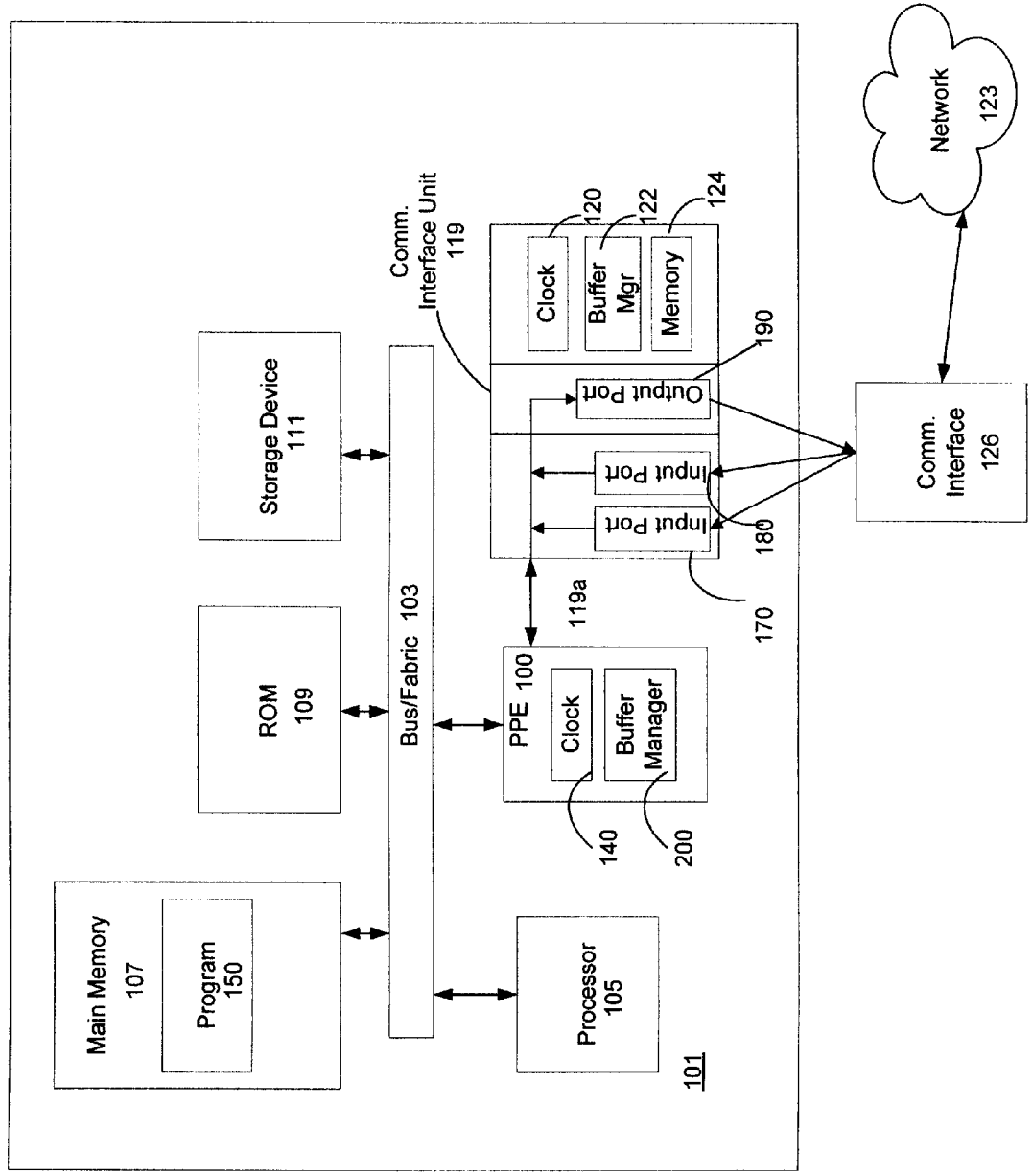
FIG. 1 illustrates an exemplary router in which methods and systems consistent with the present invention may be implemented.

FIG. 1 illustrates an exemplary router 101 consistent with systems and methods consistent with the present invention. Router 101 includes a bus 103 or a fabric for communicating information, and a processor 105 coupled with bus 103 for processing the information. Router 101 also includes a main memory 107, such as a random access memory (RAM) or other dynamic storage device, coupled to bus 103 for storing information and instructions to be executed by processor 105. In addition, main memory 107 may be used for storing temporary variables or other intermediate information during execution of instructions to be executed by processor 105. Main memory 107 includes a program 150 for implementing queue management consistent with methods and systems consistent with the present invention, described below. Router 101 further includes a read only memory (ROM) 109 or other static storage device coupled to bus 103 for storing static information and instructions for processor 105. A storage device 111, such as a magnetic disk or optical disk, is provided and coupled to bus 103 for storing information and instructions.

According to one embodiment, processor 105 executes one or more sequences of one or more instructions contained in main memory 107. Such instructions may be read into main memory 107 from another computer-readable medium, such as storage device 111. Execution of the sequences of instructions in main memory 107 causes processor 105 to perform the process steps described herein. One or more processors in a multi-processing arrangement may also be employed to execute the sequences of instructions contained in main memory 107. In alternative embodiments, hard-wired circuitry may be used in place of or in combination with software instructions. Thus, embodiments are not limited to any specific combination of hardware circuitry and software.

Although described relative to main memory 107 and storage device 111, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Router 101 includes at least one packet processing engine (PPE) 100 to process packet headers and determine the next hop of the packet. In order to store and manage the packets during processing, PPE 100 includes a buffer manager 200 and a processor clock 140. Router 101 also includes a communication interface unit 119 connected to the PPE 100 via a limited bandwidth (BW) port 119a. Communication interface unit 119 provides a two-way data communication via an external communication interface 126 that is connected to a network 123. In this embodiment, the communication interface unit 119 is electronically coupled to the packet process engine (PPE) 100 via the limited BW port 119a. In an alternative embodiment, the communication interface unit 119 may be integrated as part of the PPE 100 for communication with external communication interface 126.

The communication interface unit 119 includes input ports 170 and 180, as well as an output port 190. One of ordinary skill in the art will recognize that more input and output ports may be included within the communication interface unit 119 without departing from the spirit and scope of the present disclosure. The communication interface unit 119 also includes internal components for managing bandwidth, including a clock 120, a buffer manager 122, and a memory 124. In an exemplary implementation, communication interface unit 119 receives digital data streams representing various types of information from the external communication interface 126 via the input ports 170 and 180. Communication interface unit 119 also sends digital data streams to the external communication interface 126 via output port 190.

The bandwidth of digital data received from the external communication interface 126 is often higher than the bandwidth that the bus or fabric 103 of router 101 may handle. The communication interface unit 119 of present disclosure therefore provides a buffer manager 122 that manages bandwidth of the external communication interface 126 when receiving digital data. The buffer manager 122 performs both an en-queue operation and the combined de-queue head-drop operation, such that the bandwidth of digital data at the limited BW port 119a is lower than the bandwidth of digital data received at the input ports 170 and 180 even if the bandwidth is received at a peak rate.

Figure 2:
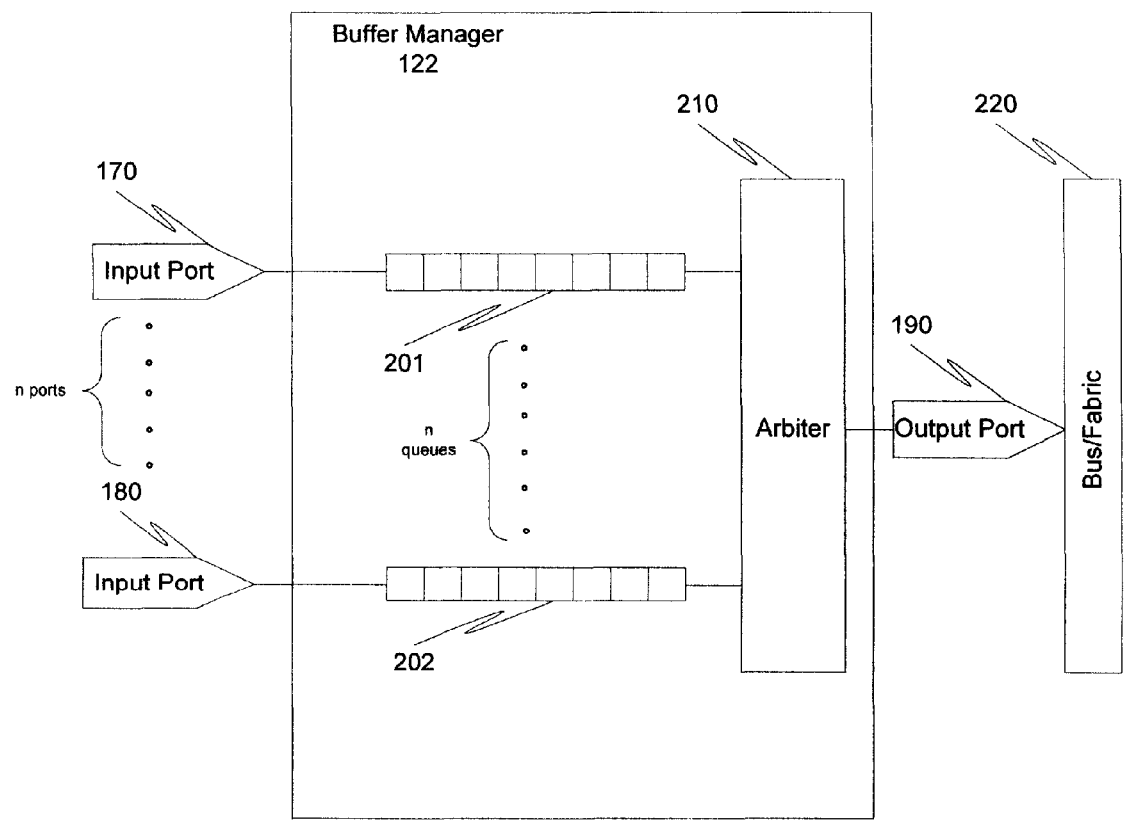
FIG. 2 illustrates a buffer manager consistent with methods and systems consistent with the present invention.

FIG. 2 illustrates a buffer manager 122 for managing bandwidth of data received from the external communication interface 126. Buffer manager 200 comprises a plurality of queues (n queues), such as queue 201 and queue 202. The plurality of queues (n queues) corresponds to a set of input ports (n ports). In an exemplary embodiment consistent with the present invention, buffer manager 122 includes queue 201 allocated to input port 170, and queue 202 allocated to input port 180. One of ordinary skill in the art will recognize that there may be any number of queues corresponding to each port. Queues 201 and 202 are allocated from memory, for example, memory 107. Because there is inherently a finite amount of memory, referred to for purposes herein as "buffer space," there is a need to balance the amount of memory used by queues 201 and 202. During periods of high traffic within the router 101, it is possible to consume all of the available buffer space.

Each of the queues 201 and 202 receive packets from their corresponding input ports, and de-queue them to the output port 190 via arbiter 210. Arbiter 210 determines which queue of queues 201 and 202 to de-queue to output port 190. Alternatively, when the buffer space cannot sustain additional packets, arbiter 210 will perform a head-drop process on queues 201 and 202. In dropping the packet, the router 101 will not process or forward the packet, thus freeing buffer space within the router. Methods and systems consistent with the present invention de-queue and drop packets fairly among the queues 201 and 202.

Figure 3:
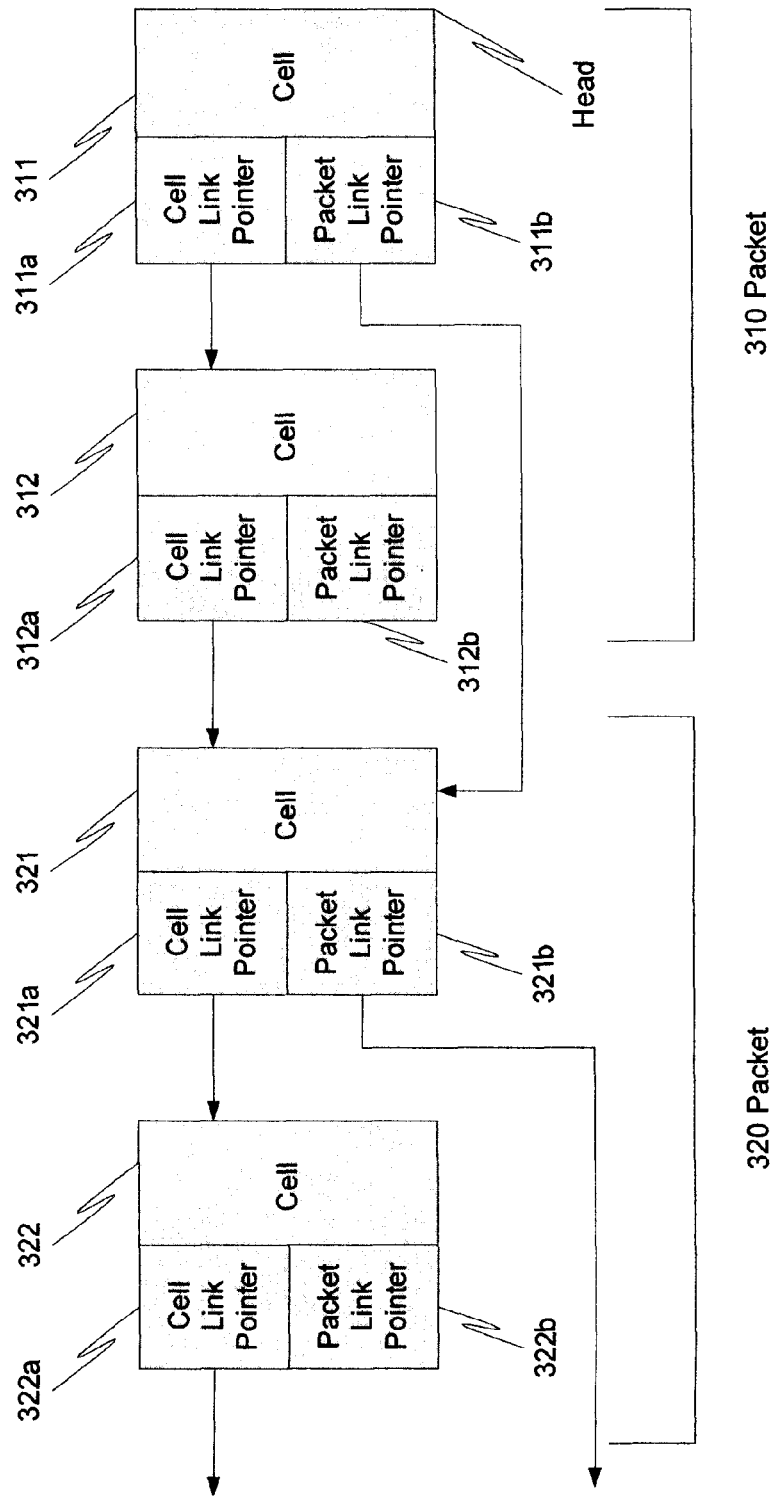
FIG. 3 illustrates an exemplary linked list data structure consistent with methods and systems consistent with the present invention.

The shared buffer is divided into the fixed size cells and these cells can be ordered by using a linked-list structure in memory 124. When a cell arrives, for example, on port 170, the packet is broken down into these fixed size cells and en-queued. An exemplary packet of 1500 bytes may be broken down into about 24 cells. Each queue 201 and 202 is implemented as a linked-list data structure in the memory 124. FIG. 3 illustrates the implementation of an exemplary queue 300 using a linked list data structure consistent with methods and systems consistent with the present invention. For each cell, there is one cell link pointer and one packet link pointer. In the illustrated example, packet 310 has two cells 311 and 312, and thus the first cell 311 is at the head of queue 300. Cell 311 includes a cell link pointer 311a to cell 312 and a packet link pointer 311b to the first cell in the next packet, which is cell 321 in packet 320. Cell 312, as the last cell in packet 310, has a null packet link pointer 312b and a cell link pointer 312a to the first cell in the next packet, which is cell 321 in packet 320. Similarly, cell 321 has a cell link pointer 321a to cell 322 and a packet link pointer 321b to the next packet in the queue (not shown). Cell 322 has a cell link pointer 322a to the next cell (not shown) and a null packet link pointer 322b. The cell links and packet links would continue until the tail of the queue, where the final cell would have null cell link and packet link pointers. When the head-drop process needs to drop a cell and it is not active within a packet, it will use the packet link pointer, such as packet link pointer 311b, to locate the next packet, such as packet 321, in the queue and become active. The packet linked list is modified so that the packet being dropped is no longer in the queue.

Figure 4:
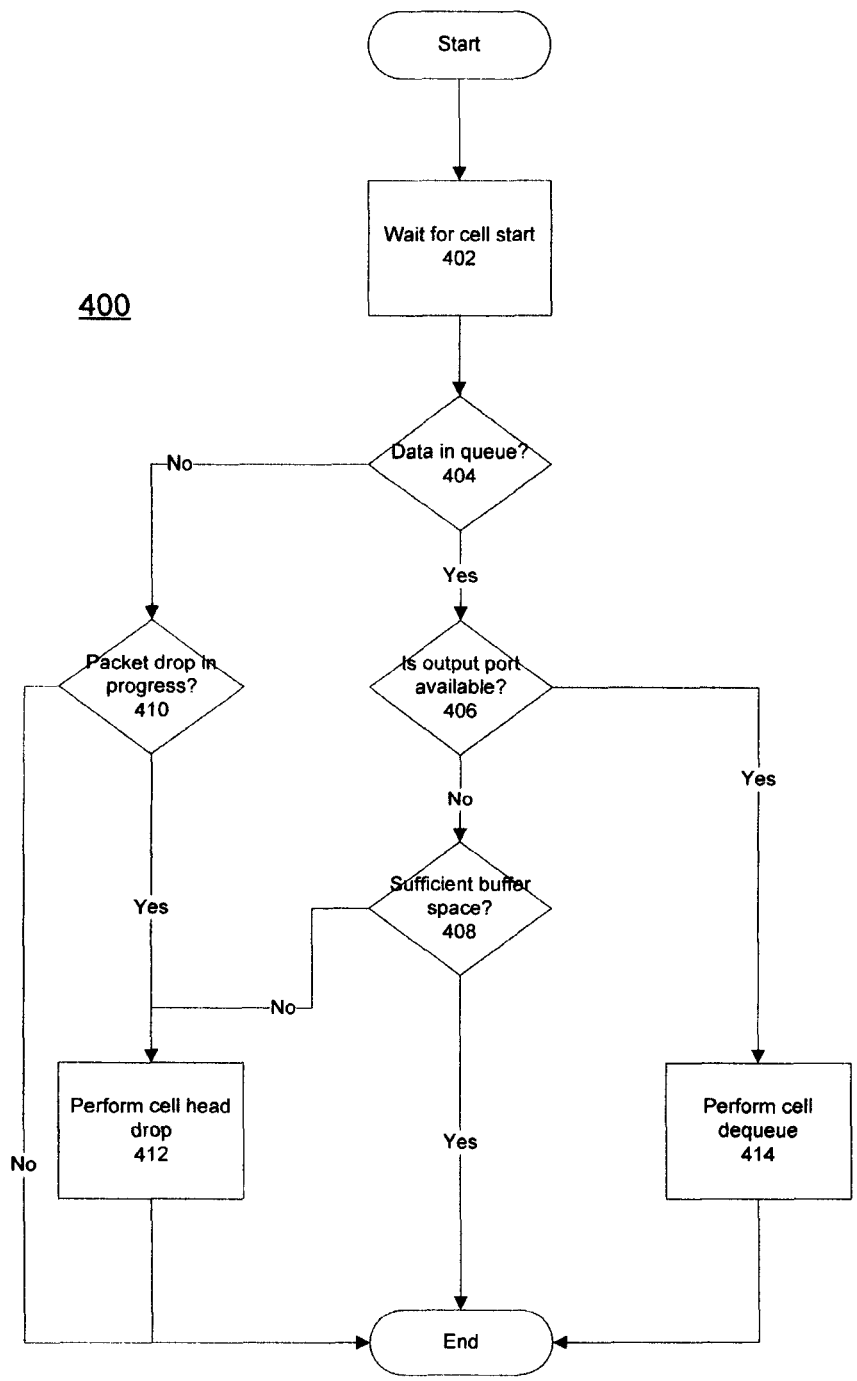
FIG. 4 illustrates a method for performing a combined de-queue and head drop operation consistent with methods and systems consistent with the present invention.

Both an en-queue operation and a combined de-queue head-drop operation run in parallel within the same number of clock cycles or a cell start period, for example, 4 clock cycles per cell. The head drop process will not run until the buffer space is full (or almost full). When the buffer space is full, the combined de-queue and head-drop operations will delete cells from the queue at the same rate as the en-queue process en-queues cells. FIG. 4 illustrates a method for performing a combined de-queue and head-drop operation consistent with methods and systems consistent with the present invention.

In this embodiment, process 400 is performed by the buffer manager 124 during one cell start cycle. Process 400 begins at step 402 to wait for a cell start cycle to begin. Next, process 400 continues to step 404 to determine if data is available in the queue to be de-queued. If data is available in the queue, a cell de-queue is necessary and process 400 continues to step 406 to determine if an output port is available to process the data in the queue. If an output port is available, process 400 continues to step 414 to perform a cell de-queue to remove a cell from the queue for processing and the process terminates. Returning to step 406, if an output port is not available, process 400 continues to step 408 to determine if there is sufficient buffer space to add additional cells. If there is sufficient buffer space, process 400 terminates. If there is not sufficient buffer space, process 400 continues to step 412 to perform a cell head drop to drop a cell without processing.

Referring back to step 404, if no data is available in the queue, the queue is empty and process 400 continues to step 410 to determine if a packet drop is currently in progress. The packet drop currently in progress refers to a process in which the last packet of the queue is being dropped. If a packet drop is currently in progress, process 400 continues to step 412 to perform a cell head drop to ensure that the packet drop is complete in finite time. When a packet is dropped, it is unlinked from the queue and attached to a dropped packet list. The dropped packet list contains only one dropped packet at a time and contains cells of the dropped packet that must be returned to a free packet list. To attach a packet to the dropped packet list, the head pointer of the dropped packet list points to the first cell of the dropped packet. The list of cells of the dropped packet does not change when the packet is dropped as the list of cells in the packet remains the same. However, if no packet drop is currently in progress in step 410, process 400 terminates.

Figure 5:
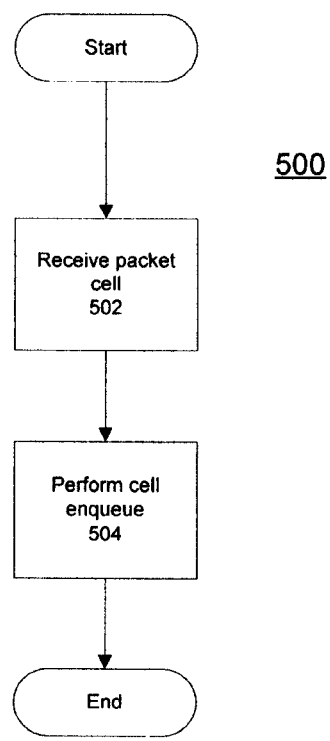
FIG. 5 illustrates a method for performing an en-queue operation consistent with methods and systems with the present invention.

As discussed above, the en-queue operation is performed in parallel with the combined de-queue and head drop operation within the same cell start cycle. Referring to FIG. 5, in conjunction with FIG. 1, a method for performing an en-queue operation is depicted consistent with methods and systems consistent with the present invention. In this embodiment, process 500 is performed by the buffer manager 124 during one cell start cycle. Process 500 begins at step 502 to receive a packet at the input port 170 or 180 from the external communication interface 126. Next, process 500 continues to step 504 to perform cell en-queue. To perform a cell en-queue, the data is placed in the queue, such as 201, when it is received at the input port 170.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

What is claimed is:

1. A method comprising:
   storing, by a processor of a device, a first data unit in a data queue;
   receiving, by the processor, a second data unit to be stored in the data queue after storing the first data unit;
   determining, by the processor, that the data queue does not include sufficient available space to store both the first data unit and the second data unit;
   allocating, by the processor, space in the data queue to store the second data unit,
   the allocating of the space including:
      determining whether an output port, associated with the first data unit, is available,
      performing, when the output port is available, a de-queue operation, the de-queue operation including removing the first data unit from the data queue, and
      performing, when the output port is unavailable, a head drop operation that includes removing the first data unit from the data queue; and
   performing, by the processor, an en-queue operation that includes writing the second data unit to the allocated space in the data queue,
   the en-queue operation being performed in parallel with the de-queue operation or the head drop operation.

2. The method of claim 1, where the second data unit includes at least one packet cell, and
   where performing the en-queue operation includes:
      storing, in the data queue, the at least one packet cell.

3. The method of claim 2, where the en-queue is performed during a cell start cycle.

4. The method of claim 1, where performing the de-queue operation on the data queue comprises:
   determining whether the first data unit is available in the data queue;
   determining whether the output port is available when the first data unit is available in the data queue, and
   performing the de-queue operation based on:
      the first data unit being available in the data queue, and
      the output port being available.

5. The method of claim 1, where performing the head drop operation further includes:
   determining whether a data drop is in progress, on the data queue; and
   performing the head drop operation when the data drop is in progress.

6. The method of claim 1, where performing the head drop operation further includes:
   determining whether sufficient space is available in the data queue after removing the first data unit from the data queue; and dropping additional data from the data queue when the data queue does not include the sufficient space, the additional data differing from the first data unit and the second data unit.

7. The method of claim 1, where performing the de-queue operation further includes:
   determining whether the output port is available; and
   sending the first data unit toward the output port in response to determining that the output port is available.

8. The method of claim 1, where performing the head drop operation includes:
   dropping the first data unit from a head section of the data queue.

9. The method of claim 1, where the data queue is associated with a linked list data structure, and
   where allocating the space further includes:
      updating the linked list data structure based on the de-queue operation or the head drop operation.

10. The method claim 9, where the first data unit is a cell associated with a packet, and
    where the method further comprises:
       maintaining a cell link pointer and a packet link pointer for the first data unit,
       where the cell link pointer points to a first location, in the data queue, of a next cell of the packet, and
       where the packet link pointer points to a second location, in the data queue, of a first cell, of a next packet stored in the data queue.

11. The method of claim 10, where updating the linked list data structure includes:
    storing, in the data queue, a last cell of the packet with at least one of:
    a null packet link pointer, or
    the packet link pointer.

12. The method of claim 10, where performing the de-queue operation and performing the head drop operation further comprise:
    removing the first data unit from a head of the data queue; and
    locating the first cell of the next packet, stored in the data packet queue, using the packet link pointer.

13. The method of claim 1, where:
    the data queue is included in a shared buffer that includes a plurality of data queues,
    storing the first data unit comprises storing the first data unit to a first data queue of the plurality of data queues,
    allocating the space on the data queue comprises allocating the space on a second data queue of the plurality of data queues, and
    performing the en-queue operation comprises performing the en-queue operation to store the second data unit in the second data queue.

14. A data processing system comprising:
    a communication interface unit for managing bandwidth of data packets received from a network, the communication interface unit comprising:
       a memory comprising a data queue; and
       a buffer manager to:
          store a first data unit in the data queue,
          receive a second data unit to be stored in the data queue after storing the first data unit, the data queue including insufficient available space to store both the first data unit and the second data unit,
          determine whether an output port, associated with the first data unit, is available,
          perform, when the output port is available, a de-queue operation, the de-queue operation including removing the first data unit from the data queue, and
          perform, when the output port is not available, a head drop operation that includes removing the first data unit from the data queue, and
          perform an en-queue operation, the en-queue operation including writing the second data unit to the data queue,
       the buffer manager performing the en-queue operation in parallel with at least one of the de-queue operation or the head drop operation.

15. The data processing system of claim 14, where the buffer manager is further to receive the second data unit via at least one input port coupled to the network.

16. The data processing system of claim 14, where each of the first data unit and the second data unit comprises a respective cell associated with a packet.

17. The data processing system of claim 15, where the data queue is associated with the at least one input port.

18. The data processing system of claim 14, where:
    the memory further comprises a linked list data structure associated with the first data unit,
    the first data unit is a cell associated with a packet,
    the linked list data structure includes
       a cell link pointer that points to a first location, in the data queue, of a next cell of the packet, and
       a packet link pointer that points to a second location, in the data queue, of a first cell, of a next packet stored in the data queue, and
    the buffer manager, when performing the en-queue process, is further to:
       determine whether the second data unit is associated with the packet, and
       update the linked list data structure based on whether the second data unit is associated with the packet.

19. A non-transitory computer readable medium to store instructions, the instructions comprising:
    one or more instructions which, when executed by a network device, cause the network device to:
       store a first data unit in at least one data packet queue;
       receive, after storing the first data unit, a second data unit to be stored in the at least one data packet queue, the at least one data packet queue including insufficient available space to store both the first data unit and the second data unit;
       determine whether an output port, associated with the network device, is available;
       perform, when the output port is available, a de-queue operation, the de-queue operation including removing the first data unit from the data queue; and
       perform, the output port is unavailable, a head drop operation that includes removing the first data unit from the data queue,
       the en-queue operation being performed in parallel with at least one of the de-queue operation or the head drop operation.

20. The non-transitory computer readable medium of claim 19, where the first data unit is associated with a first packet, and the computer readable medium further comprises:
    one or more instructions which, when executed by the network device, further cause the network device to:
       store a linked list data structure associated with the first data unit, the linked list data structure including a pointer that identifies a first cell of a second packet that differs from the first packet; and
       locate, as the second data unit, the first cell of a next packet using the pointer associated with the first data unit.

* * * * *